Fig. 1.

INVENTOR.
JEAN EMAIN
BY
ATTORNEY.

Oct. 17, 1961    J. EMAIN    3,004,525
AUTOMATIC CONTROL SYSTEM
Filed March 2, 1959    6 Sheets-Sheet 5

3,004,525
AUTOMATIC CONTROL SYSTEM
Jean Emain, 44 Rue du College, Saint Claude, Jura, France
Filed Mar. 2, 1959, Ser. No. 796,648
Claims priority, application France Mar. 27, 1958
12 Claims. (Cl. 121—38)

This invention relates to systems for controlling multifunction apparatus in accordance with a pre-selected program and it is especially applicable to the automatic control of such cyclically operable apparatus as multipurpose machine-tools, and the like.

In the automatic control of machining operations (this being taken as a convenient example for explaining the utility of the control system of the invention), it is desired to initiate each of a predetermined series of machining operations and possibly further functions such as the transfer of work from one machining station to another, at accurately predetermined instants in a complete machining cycle. The timing of these operations and/or other functions will of course vary with the work to be done. Also, the order or sequence in which the functions are to be performed may have to be varied with different work. It is a general object of this invention to provide an improved and versatile control unit whereby these and analogous results may be accomplished in a simple, efficient, reliable and accurate manner.

In accordance with an important aspect of the invention there is provided a device for controlling multifunction apparatus in accordance with a pre-selected program which device comprises a rotatable shaft, a plurality of axially spaced first elements (e.g. cams) on the shaft, a plurality of angularly-spaced axially settable second elements (e.g. an annular array of axially adjustable pins) on the shaft, stepping means for rotating the shaft to present said first elements in sequence to a first sensing station and simultaneously present said second elements in a corresponding sequence to a second sensing station, means responsive to presentation of one of said first elements at said first station for initiating the performance of a related one of said functions of the controlled apparatus, a feeler, and means for displacing the feeler relatively to the shaft at a controlled velocity from an initial position along a predetermined path extending into cooperative relation with the second element simultaneously presented at said second station, means responsive to attainment by the feeler of said cooperative relation to impart a step of rotation to the shaft by said stepping means and simultaneously restore the feeler to said initial position, whereby the selective settings of said second elements will determine the relative times at which said first elements will initiate the performance of said respective functions. If desired, the settings of said first elements may further be made to select the order or sequence of performance of said functions.

The various components of the device may assume a variety of forms. Thus the first elements may be cams, and such cams may act at said first sensing station upon fluid control valves connected in the circuits of respective fluid pressure operated actuators forming part of the controlled apparatus and responsible for the performance of said respective functions thereof. Alternatively, the first elements may be electric contacts adapted to engage cooperating contact means at said first station for energizing electric motors forming part of the controlled apparatus and responsible for the performance of said functions thereof.

The second settable elements are preferably provided, as already mentioned, in the form of an annular array of pins carried by the shaft and extending parallel thereto, with such pins being individually adjustable in the axial direction. The feeler may assume the form of an electric contact element which is moved, at each step of rotation of the shaft, along a linear path of displacement (e.g. parallel to the shaft) at a controlled uniform velocity until it engages the particular second element or pin which is, at that step of shaft rotation, presented at the second sensing station. Since the velocity of feeler displacement is uniform it will be evident that the instant at which the feeler attains its cooperating or engaging relation with the pin thus presented depends on the axial setting of that particular pin. On attaining its cooperating relation with the pin, the feeler may complete an energizing circuit for an electromagnetically controlled stepping device to impart a further step of rotation to the shaft, or may act in any other suitable manner to impart such step of rotation to the shaft.

A clearer understanding of the invention will be had from the ensuing description which is to be read with reference to the accompanying drawings, in which.

Figure 1:
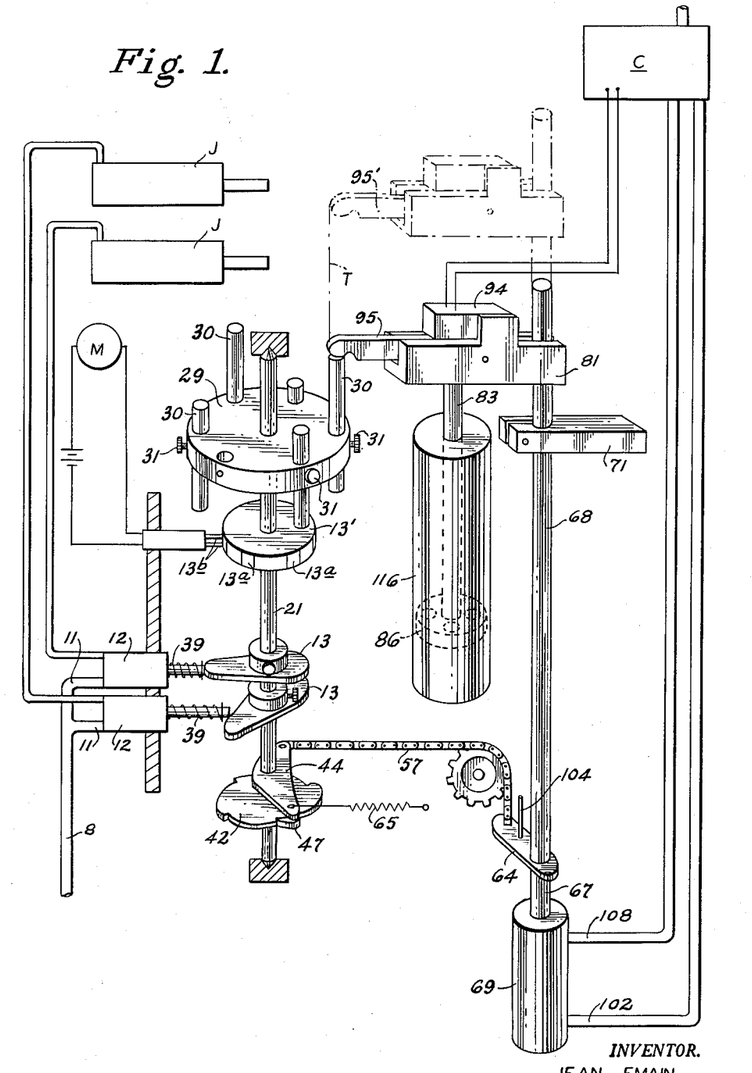
FIG. 1 is a diagrammatic perspective view of an automatic control unit according to the invention for explanatory purposes.

A brief description of the invention will first be given with reference to FIG. 1. As there shown, the control unit comprises a main shaft 21 and means for rotating said shaft step by step, the number of steps or increments of angular movement in each complete revolution of the shaft being essentially equal to the number of separate operations or functions in each operating cycle of the apparatus to be controlled, e.g. the number of separate machining operations per complete machining cycle. The stepping means, in the example shown, comprises a ratchet 42 and an associated pawl 47 actuated by a fluid-pressure operated motor 69 which is supplied with fluid under pressure through an electromagnetically operated controller C. The fluid-pressure operated motor 69 is connected to the pawl 47 by way of a transmission which is schematically represented at 57, 64 and 67. Secured on the shaft in axially spaced relation are a plurality of cams 13. At each step of rotation of the shaft 21, as determined by the ratchet 42, one or more of said cams 13 is or are presented to a sensing station at which said cams each actuate a cooperative element, shown as a spring-pressed plunger 39. These plungers may, for example, form part of pneumatic valves 12 which are connected in the compressed air control circuits for respective pneumatic jacks J forming part of the controlled apparatus so that presentation of an active area of each cam to this sensing station will initiate a corresponding function in said apparatus. It is to be understood however that the elements presented to this sensing station are not necessarily cams. Thus, to illustrate this, there is also shown secured on the shaft 21 a rotary switch disc 13' carrying contact segments 13a adapted to be presented to a cooperating contact element 13b at the sensing station. Such electric contact means may be used instead of or in addition to the cams.

The shaft 21 further carries a drum 29 supporting an annular array of axially extending timer elements in the form of pins 30, each of which is axially adjustable in a corresponding bore of drum 29 and is held in its axially adjusted position with respect to the shaft by means of a set screw 31. At each step of rotation of the shaft, as a particular cam (or switch contact) is presented to the first sensing station, a particular pin is simultaneously presented to a second sensing station. In FIG. 1, it is the endmost right-hand pin which is shown as being presented to the second sensing station. At this second sensing station there is positioned a displaceable feeler element 95 which is linearly displaceable along a path T generally parallel to the shaft 21, from an initial position 95'. Means are provided whereby, as the shaft is stepped to each of its angular positions, the feeler 95 starts to move away from its initial position 95' and this movement is effected at a strictly controlled, and preferably uniform, velocity. One convenient way of controlling the velocity of movement of the feeler is by means of an hydraulic damping cylinder 116 having a piston 86 reciprocable therein and connected to the feeler 95 by structure diagrammatically indicated at 81 and 83. Although gravity causes downward movement of piston 86 in damping cylinder 116, the upward movement or return movement of piston 86 may be effected by a connection schematically represented at 68, 71 between transmission 67 and structure 81 and which can act on the latter only in the upward direction. Although a particular device is described herein any other suitable means may be used for controlling the velocity of movement of the feeler along its path T. It will be evident that the particular time interval elapsing from the instant the feeler leaves its initial position 95' to the instant it encounters the top of the pin 30 positioned in its path of motion T depends on the axial adjustment of the particular pin 30 that is presented to the second sensing station in this particular angular position of the shaft 21. On the feeler 95 encountering the pin 30 placed in its path, the feeler 95 actuates a switch 94 by which the control mechanism C performs a two-fold action. First, it acts to supply fluid under pressure to motor 69 in the direction for restoring the feeler 95 to its initial or raised position and for conditioning pawl 47 to act on ratchet 42, and, secondly, it reverses the direction of supply of fluid under pressure to motor 69 to operate pawl 47 and thereby impart a further step of rotation to the shaft 21 by way of ratchet 42, and simultaneously frees feeler 95 for downward movement at the controlled velocity determined by damping cylinder 116. In this way it will be evident that the previous axial setting of the various timing pins 30 of the annular array, in determining the time interval required for the feeler 95 to engage each particular pin along its path, will serve to determine the time at which the shaft is advanced by one step of rotation to present the next cam 13 to the first sensing station and hence the time at which the next function of the controlled apparatus will be initiated.

A particular exemplary embodiment of the invention will now be described in greater detail with reference to FIGS. 2–9. It will of course be understood that the description and drawings are in no way restrictive. Thus, while electropneumatic control means are shown, any other forms of energy may of course be used.

The components of the automatic sequencing unit as a whole are mounted in a casing, such as a metal cabinet, shown as comprising a pair of spaced upright walls 1 and 2, and a pair of spaced horizontal shelves 3 and 4 welded or otherwise assembled with one another.

Compressed air from a suitable source is delivered to the sequencing unit through an inlet connection 5 (FIG. 3) in a side of the cabinet, and is thence passed to a filter and expander device 6 and into a supply line 7 which divides into two branch lines 8 and 9. The branch line 8 has a cut-off valve 10 in it and further has a series of outlets 11 formed at spaced points along it, which outlets connect with respective valves 12. The valves 12 have respective actuating valve shanks 39 projecting from one end thereof and rotatably carrying cam-follower rollers which are arranged to be engaged by respective cams 13 (see FIG. 2) secured in spaced relation on a camshaft 21. The valves 12 control the flow of the compressed air to the supply circuits of actuators or jacks forming part of the controlled apparatus, not shown, so that said jacks will be energized and deenergized in a selected sequence on rotation of the camshaft as will be later described in detail. The valves 12 are supported and maintained in their spaced relationship to one another by means of a pair of tie-rods or bolts extending between spaced flanges 115 extending from wall 1 of the casing, and secured to the flanges by nuts 114.

Figure 7:
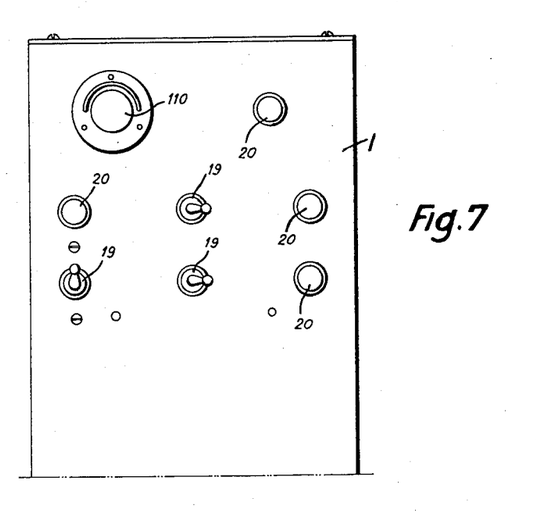
FIG. 7 is a partial elevational view of the left side of the unit showing the arrangement of control switches and signal lights.

Electric power is supplied to the unit through a terminal box 18 (FIG. 3) whence it is delivered to the proper terminals, such as the control switches 19 and the signal lamps 20 positioned at suitable locations on the upper portion of the upright wall 1 (FIG. 7). It will be understood that the electric circuit connections used may differ depending on the particular automatic control problem to be handled, and the precise form of such circuit is immaterial to the subject matter of the present invention. The circuit will, therefore, not be described herein.

Figure 2:
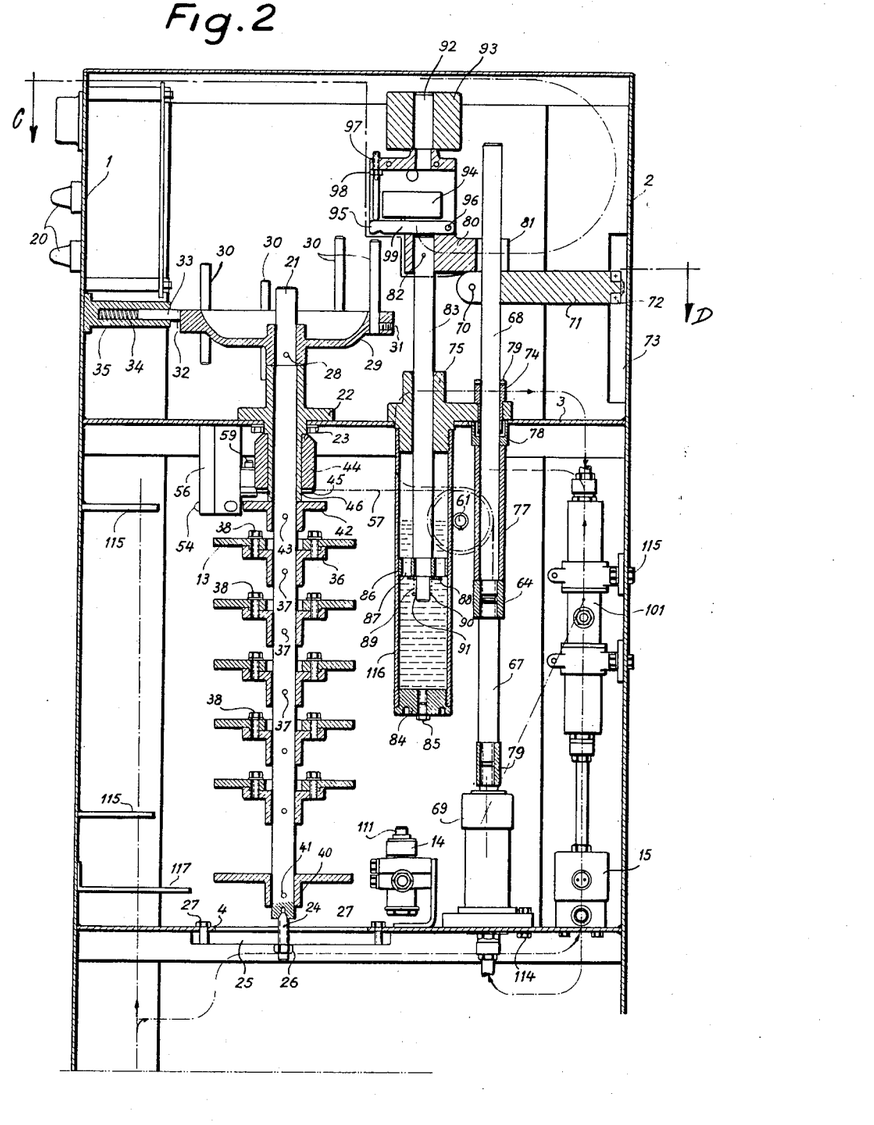
FIG. 2 is an elevational view, partly in section, showing an electro-pneumatic embodiment of the control unit of the invention as viewed on a–b of FIG. 6, and with a timer assembly which is included in the unit being shown in its uppermost position.

As shown in FIG. 2, the afore-mentioned camshaft 21 is journalled near its upper end in a first bearing 22 secured to the upper shelf 3 by bolts 23, while its lower end is centrally supported on a pivot 24 secured with a nut 26 in a bracket 25 secured to the shelf 4 with screws 27. Secured on the upper end of the camshaft above the bearing 23 by means of a cotter-pin 28, is a drum or annulus 29 which carries the annular array of axially projecting timer pins 30. The pins 30, in principle, are equal in number to that of the elementary operations which the controlled apparatus is to perform per cycle. The pins 30 are independently axially adjustable relative to the drum and for this purpose are slidable in sockets formed in the drum and are held in desired axial positions by set-screws 31. The outer periphery of timer drum 29 is formed with notches 32 corresponding in number and angular position to the individual timer pins 30, and sequentially receiving a detent latch 33 which is slidable in the bore of a boss 35 welded to the upright wall 1. The detent latch 33 is urged by a detent spring 34 into engagement with the drum periphery.

As already mentioned, cams 13 are mounted in spaced relation on camshaft 21. For this purpose, the camshaft has cam-carriers 36 provided in any suitable number, herein five, and secured to the camshaft, for example, by pins 35. Removably supported on each cam carrier through screws 38 is a cam 13. The arrangement is such as to permit the respective cams to engage the cam-follower rollers journalled on the valve actuator shanks 39 operating the valves 12.

Further, in this illustrative embodiment, the camshaft 21 carries a fixed cam 40 near its lower end, and cooperating with a pair of contacts, not shown, carried on a bracket 117, for energizing and deenergizing an electric circuit.

Figure 5:
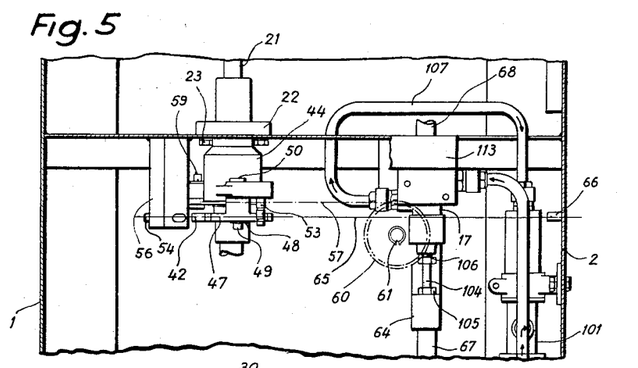
FIG. 5 is a partial elevational view, with the casing broken away, illustrating the camshaft rotating mechanism and the means for operating the return valve means for the camshaft operating member.

The ratchet wheel 42 is secured on camshaft 21 by means of a pin 43 and is formed with as many ratchet teeth as there are timing pins 30 on drum 29. Freely rotatably mounted upon a sleeve-like extension of the bearing 22 surrounding the camshaft 21, is the hub part of a lever 44, better shown in FIGS. 5 and 6. The lever 44 is retained on the sleeve-like extension of bearing 22 by means of a retainer washer 45 and a "circlip" ring 46. Pivoted on an end of the lever 44 is a pawl 47 which is shown in dotted lines on FIG. 6 and which is retained on its pivot 50 by means of a washer 48 and pin 49 (FIG. 5). Pawl 47 is urged into engagement with the ratchet 42 by a spring 51 extending between an anchor pin 53 on lever 44 and a stop pin 52 on the pawl. As will presently appear, the lever 44 carrying the pawl 47 is adapted to be rotated relatively to the camshaft 21 and the ratchet 42. In the endmost position assumed by lever 44 during each such rotation, which is the position shown in dotted lines in FIG. 6, the pawl 47 pivoted on the lever is arranged to engage a threaded abutment pin 54 which extends threadably through a tapped bore in a support 56 welded to the underside of shelf 3, and which is held in adjusted position by a nut 55, so that the setting of the pin 54 adjustably determines the length of the rotary stroke of the lever 44. The rotation of the lever 44 is resiliently restrained by a spring schematically indicated by its center line 65, which has one end anchored on the afore-mentioned pin 53 on the lever and its other end anchored to a fixed post 66 on wall 2.

For rotating the lever 44, the end of the lever remote from that carrying the pawl 47 has a yoke pivoted thereon, as at 59. Attached to the yoke is one end of a sprocket chain indicated by its center line 57, and which chain is trained around a sprocket 60 rotatable on a post 61 suported from a bracket 62 welded to the shelf 3. The end of the chain beyond the sprocket 60 is fixed to an anchor post 63 secured on an arm 64 mounted for reciprocating movement in a vertical plane. Reciprocating movement is imparted to the arm 64 by a double-acting pneumatic jack 69 (FIG. 2) bolted at 114 to shelf 4, and having a piston rod which is connected, by way of a screw connector ring 79, with one end of a connecting shaft 67 the other end of which is screwed into the arm 64 as is apparent from FIG. 2. Further, the arm 64 is similarly connected with one end of a shaft 68 aligned with shaft 67 and projecting vertically in the opposite direction from the arm 64. Shaft 68 slidably extends through a bushing 74 fitted in an opening in the shaft 3. The upper part of the shaft 68 above the shelf 3 has secured to it by means of a clamping screw 70 the slotted end of an arm 71 projecting perpendicularly from shaft 68 and having a ball bearing 72 mounted on its free end, which rotatably engages a slideway defined between ways 73 fixed to the upright wall 2, so as to guide the reciprocation of shaft 68 and arm 64. The uppermost position of reciprocation of arm 64 is defined by abutment of the arm with the lower end of a spacer sleeve 77 freely surrounding the shaft 68 and having its upper end secured to the under side of shelf 3.

Figure 6:
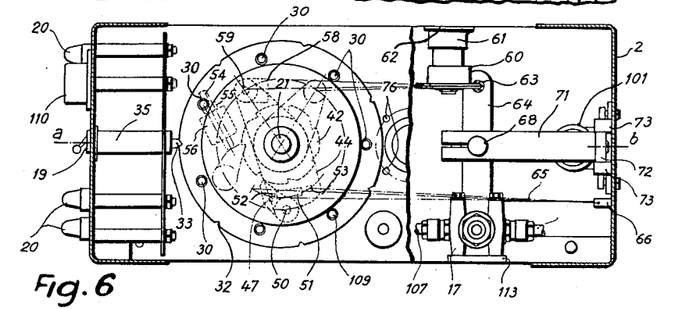
FIG. 6 is a horizontal sectional view taken along the line C—D of FIG. 2 and showing the drum carrying the timing pins, the ratchet lever controlling camshaft rotation, and the control mechanism therefor.

On downward movement of the arm 64, produced in a manner to be later described, the free end of the lever exerts a downward pull upon the chain 57, thereby rotating the lever 44 clockwise according to FIG. 6. Such rotation of lever 44 imparts, through pawl 47, a step of rotation to the ratchet 42 and hence to the camshaft 21. It will be understood that during each angular displacement of the camshaft, the cams thereon are placed in a corresponding rotational position to select a new set of the air valves 12 for operation, hence actuating a new set of pneumatic jacks on the controlled apparatus. Simultaneously, one of the timer pins 30 on the drum 29 is disposed in the vertical path of motion of the feeler 95 which is presently described.

During the upward stroke of the arm 64, the arm 71 which is moved therewith engages at a certain point against the under side of a member 80 which is pinned at 82 to the top of a piston rod 83 extending from a piston 86 reciprocable in a timing damper cylinder 116.

The member 80 is formed with a cutout 81 through which the shaft 68 is normally slidable. On engagement of the arm 71 with the member 80, the latter, together with the piston rod 83 and piston 86, are moved bodily upward.

The timing damper cylinder 116 has a bore machined to close tolerances within which the piston 86 is slidable. The cylinder 116 has its upper end secured, e.g. screwed, about a cylindrical extension of a supporting member 75 secured on shelf 3 and formed with a bore through which the piston rod 83 is sealingly slidable. A bottom end closure 84 of the cylinder 116 is provided with a drain plug 85. The cylinder 116 is adapted to contain a body of damping fluid, such as oil. The piston 86 is formed with one or more passages 87 extending through it for the controlled flow of damping liquid, such flow being controlled by a check-valve in the form of a disc 88 urged upwardly against the under side of the piston by a spring 87 retained on the bottom end of the piston shaft by a circlip 91. It will be understood that upward movement of the piston 86 through the oil in the cylinder is substantially unimpeded, since the check valve member 88 is then forced away from the piston by pressure against spring 89. On the other hand, on downward movement of the piston, the disc 88 is applied against the passages 87 so as to substantially block such passages. Under such conditions the descent of the piston and connected parts is effected at an accurately controllable uniform velocity determined by the area of the passages 87 remaining open, the viscosity of the oil and the mass of the moving parts.

Mounted on the top of piston rod 83 is a feeler assembly which comprises a micro-switch generally indicated at 94 and including an actuator pin 99 projecting downwardly from it and adapted when urged upwards to close the switch. A feeler lever 95 pivoted at 96 on the assembly below switch 94 is engageable with the switch actuating pin 99 for urging the latter upwardly to the switch closing position. Removably mounted on a stubshaft 92 projecting from the top of the feeler assembly is a weight 93.

On downward movement of the piston 86 and associated parts at the uniform, preselected rate, the tip of feeler 95 encounters the particular timer pin 30 which is positioned in its vertical path of movement, and thereupon the feeler is raised to act on the micro-switch 94 to close the electric circuit in which the switch is connected. It will be understood that the particular point of the operating cycle at which this occurs is determined by the vertical setting of the particular pin 30 which has been presented by the camshaft into the path of travel of the feeler. In order that the entire weight of the timing damper will not be borne by the actuating pin 99 of switch 94 after closing of the latter, the upward swinging of feeler 95 is limited by an adjustable stop screw 97 which is locked in adjusted position by a nut 98. On closure of switch 94 an energizing circuit is completed for energizing an electromagnetically operated valve 15 which thereby permits the passage of compressed air from supply branch line 9 through a line 100 (see FIG. 4) to the lower end of a flow control valve 101, secured to the upright wall 2 by screws 115. The slidable valve spool, not shown, of this control valve 101, is now displaced in its bore of the valve housing and allows compressed air to flow from supply line 9 to a line 102 connected with the under side of the jack cylinder 69, as clearly shown in FIG. 3. The piston 103 slidable in cylinder 69 is thereupon driven upwards, carrying with it the assembly comprising shaft 67, arm 64, shaft 68 and arm 71.

As previously mentioned, at a predetermined point arm 71 engages the underside of part 80. When this occurs, the feeler assembly including feeler 95 is lifted out of engagement with the pin 30 and the switch 94 is allowed to return to its normally open condition. On reaching its uppermost position, further movement of arm 64 is arrested by engagement with sleeve 77. At this time, a screw stop 104 (FIG. 5) adjustably mounted on arm 64 and locked in adjusted position by means of a nut 105 acts on a valve member 106 projecting from a valve 17 which is mounted on a bracket 113 welded to the shelf 3. Actuation of the valve 17 permits compressed air to pass therethrough from the supply line 9 to a line 107 connected with the upper end of the flow control valve 101 mentioned above. The spool of valve 101 is now displaced in the opposite direction so as to cut off the previously established connection from line 9 to line 102, and open instead a connection from line 9 to a line 108 (FIGS. 3 and 4) connecting with the upper end of the jack cylinder 69. The jack piston 103 is now urged downwards, and carries with it the assembly comprising shaft 67, arm 64, shaft 68, and lever 71. This assembly is thus given a rapid downward movement and the arm 71 disengages the under side of the part 80, which together with the assembly including the feeler 95, proceeds to descend at a slow controlled rate due to the damping action on piston 86 as previously described, until the feeler 95 again engages the top of a timer pin 30 which had been interposed in its path.

It will be obvious that various changes may be made in one or more of the components of the system described with reference to FIGS. 2 to 7 within the scope of the invention. By way of example, a modified form of the timing arrangement, adapted to be substituted for the timing arrangement including the damping cylinder 116 and piston 86, will now be described with reference to FIGS. 8 and 9.

Figure 8:
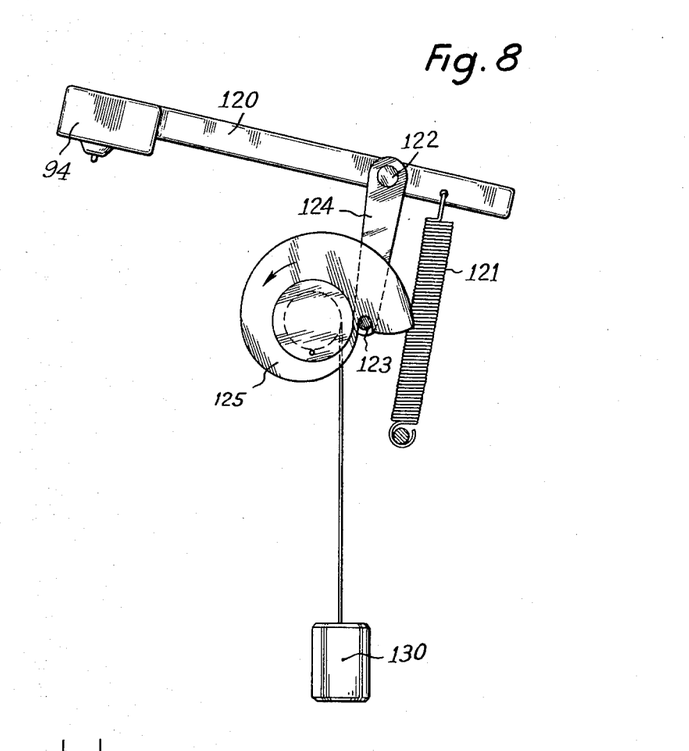
FIGS. 8 and 9 are detailed views showing a modified embodiment.
Figure 9:
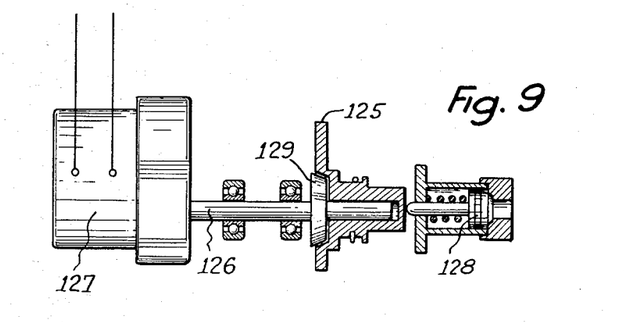

In this modification, the feeler assembly, of which only the switch 94 is shown in FIG. 8, rather than being mounted at the top of a vertically slidable shaft 83 as in FIG. 2, is mounted at the end of a rocker shaft 120 which is urged in the clockwise direction to raise switch 94 by a spring 121. A lever 124 projecting from the arm carries a follower finger 123 which engages the contour of an Archimedean spiral cam 125 which is mounted for free rotation on a shaft 126 as is shown in FIG. 9. The shaft 126 is continuously rotated by way of a reducer gearing from a constant-speed electric motor 127 or other source of constant-speed rotation. The cam 125 is adapted to be rotated with shaft 126 by engagement of coacting frustoconical friction surfaces of the cam and a clutch disc 129 secured on the shaft. Such engagement is effected by the action of a spring-urged plunger 128 operated by a small pneumatic jack, a solenoid, or the like. It will be understood that in this modification, upon coupling of the cam 125 with the constantly driven shaft 126, the cam will start rotating in the direction shown by the arrow on FIG. 8 and the feeler assembly will start to be moved at a controlled uniform rate (as determined by the contour of cam 125) over its path of movement towards engagement with the timing pin 30, as previously described. At such time, the switch 94 completes a circuit for electrovalve 15 and an operating cycle will then be initiated similar to that described in the first embodiment. The return of the cam 125 to its initial position may conveniently be effected by means of a counterweight 130, as shown, upon disengagement of the clutch disc 129 from cam 125.

Figure 3:
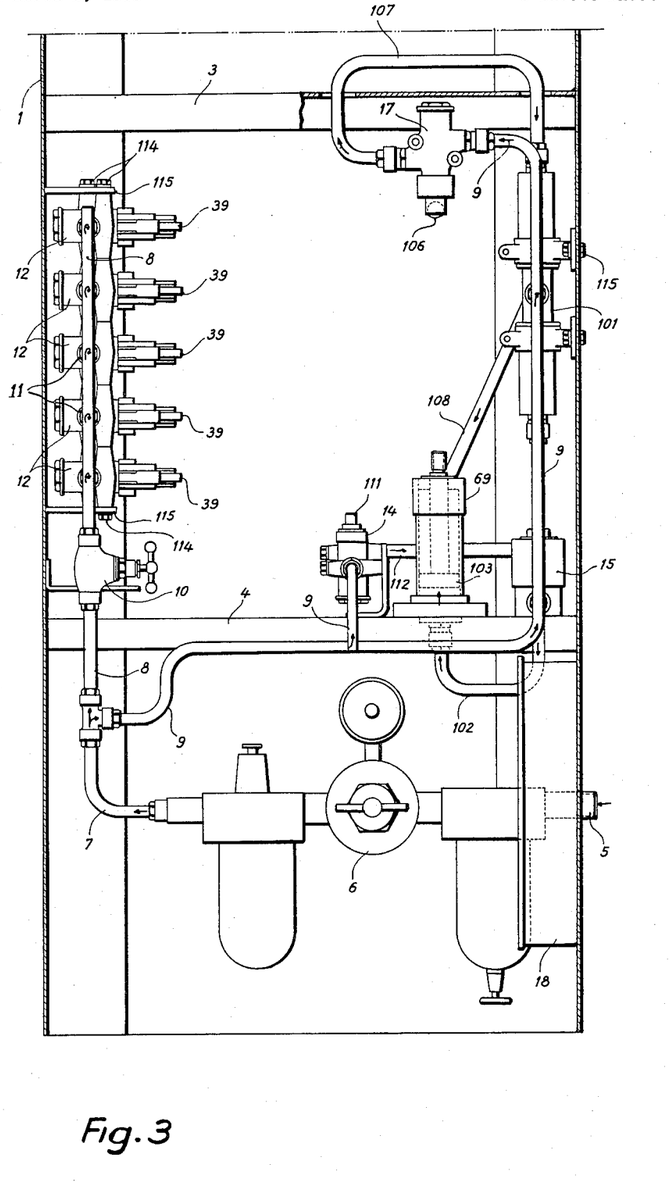
FIG. 3 is an elevational view, with the casing broken away, of the same unit principally illustrating the pneumatic flow lines and the pneumatic controlling and controlled means.
Figure 4:
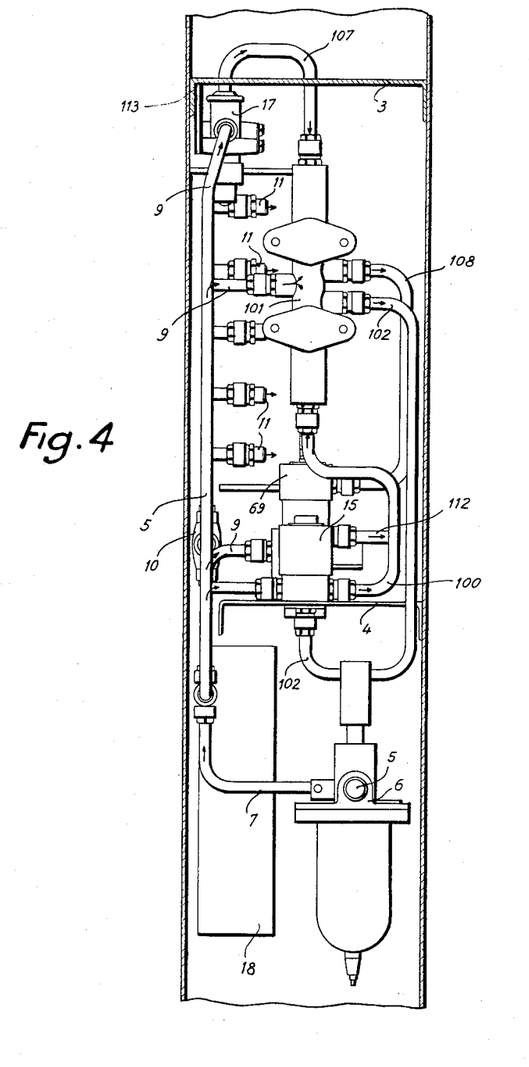
FIG. 4 shows the same unit as seen from the right side thereof, with the casing broken away, and principally showing the pneumatic flow lines and operating components.

A valve 14 shown in FIGS. 2 and 3 is preferably provided for emergency use and adjustment. In case of failure of electric power, action on a push-button 111 actuating said valve will open a flow path for compressed air from supply line 9 to the lines 112 and 100 successively, thereby substituting for the action of the electrically operated valve 15.

Provision is made for cycle-by-cycle operation of the system rather than continuous cyclic operation, when so desired. To institute such cycle-by-cycle operation, it is simply necessary to omit, or remove, one of the pins 30 on the timing drum 29, e.g. the timer pin 109 (FIG. 6). The system will then come to a stop of its own accord after the drum has been rotated to the position in which the vacant position of the pin 109 is presented to the path of the feeler. To resume operation, an "On" switch 110 (FIGS. 6 and 7) may then be operated to energize the electrovalve 15. Such one-cycle or semi-automatic operation may be conveniently used for adjustment and the like.

What I claim is:

1. A system for controlling multi-function apparatus in accordance with a pre-selected program comprising; a rotatable shaft; a plurality of axially spaced angularly settable first means on the shaft; a plurality of angularly-spaced axially settable second means on the shaft; stepping means operable to rotate the shaft to selectively present said first means in a predetermined sequence to a first sensing station and to simultaneously selectively present each of said second means to a second sensing station; means at said first station connected with said apparatus and each responsive to presentation of a corresponding one of said first means at said first sensing station to initiate a respective one of said functions; a feeler and means for controlling the displacement of the feeler relatively to said shaft at a controlled rate from an initial position into cooperative relationship with a second means presented at said second station; control means for said shaft stepping means operative in response to attainment by the feeler of said cooperative relationship to return said feeler to said initial position and then to impart a step of rotation to the shaft while simultaneously freeing said feeler for displacement from said initial position; whereby the selective setting of said first means will determine the order of performance of said functions while the selective setting of said second means will determine the relative times at which said functions are performed.

2. A system for controlling multi-function apparatus in accordance with a preselected program comprising: a rotatable shaft; a plurality of axially spaced first means on the shaft; a plurality of axially settable second means on the shaft; stepping means operable to rotate the shaft to present pre-selected ones of said first means to a sensing station; means at said station connected with said apparatus for initiating a respective one of said functions thereof on presentation of a corresponding one of said first means at said station; a feeler and means for axially displacing the feeler relatively to the shaft at a controlled rate from an initial position into cooperative relationship with a second means; and control means connected with said feeler and said stepping means and responsive to attainment by the feeler of said cooperative relationship to restore said feeler to said initial position and to impart a step of rotation to said shaft; whereby the setting of the second means will determine the times at which said functions are performed.

3. A system for controlling multi-function apparatus in accordance with a pre-selected cyclic program comprising: a rotatable shaft; a plurality of axially displaced angularly settable first means on the shaft; a plurality of angularly displaced axially settable second means on the shaft; stepping means operable to rotate the shaft to selectively present said first means to a first sensing station in a predetermined sequence and simultaneously present a corresponding one of said second means to a second sensing station; means at the first station connected with the apparatus and responsive to presentation of a corresponding one of said first means at said first station to initiate a respective one of said functions; a feeler and means for axially displacing the feeler relative to the shaft at a controlled rate from an initial position into feeling relation with a second means presented at said second station; and control means connected with the feeler and said stepping means and responsive to attainment by the feeler of said feeling relation for restoring the feeler to said initial position and for imparting a step of rotation to said shaft; whereby each shaft revolution will cause said apparatus to go through an operative cycle in which the order in which said functions are performed is determinable by the angular setting of the first means and the time lapses between performance of said functions are determined by the axial settings of the second means.

4. A system as in claim 1, wherein said first means comprise cams.

5. A system as in claim 1, wherein said first means comprise electric contact means.

6. A system as in claim 1, wherein said second means comprise pins carried in angularly spaced relation on the shaft and extending parallel to said shaft and individually adjustable in axial position with respect thereto.

7. A system as in claim 1, wherein the means for controlling the rate of feeler displacement comprise a hydraulic damper arrangement.

8. A system as in claim 1, wherein the means for controlling the rate of feeler displacement comprise camming means.

9. A system as in claim 1, wherein said shaft stepping means is electrically controlled and said feeler comprises electric contact means connected with said stepping means.

10. A system as in claim 1, wherein said means at said first sensing station connected with said apparatus comprise fluid control valve means, and wherein the respective function of the apparatus are initiated by fluid pressure operated actuating means each having fluid pressure supply means under the control of the respective fluid control valve means.

11. A system for controlling multi-function apparatus in accordance with a preselected program, comprising a rotatable shaft, stepping means operative to effect the step-by-step rotation of said shaft, a plurality of first control elements axially spaced on said shaft and being angularly adjustable relative to the latter for selective presentation in accordance with a predetermined sequence at a first sensing station upon the step-by-step rotation of said shaft, means at said first sensing station for each of said first control elements and being actuable by the related first control element upon presentation of the latter at said first sensing station to initiate a respective one of the functions of the apparatus, a plurality of second control elements which are axially adjustable on said shaft and which are mounted in angularly spaced relation on the shaft for selective presentation at a second sensing station simultaneously with the presentation of a related one of said first control elements at said first station, feeler means movable relative to said shaft from an initial position remote from said second control elements into engagement with the second control element then presented at said second sensing station, means for displacing the feeler means relative to said shaft at a controlled rate from said initial position, means for returning said feeler means to said initial position, and control means responsive to the engagement of said feeler means with a second control element to operate said means for returning the feeler means to its initial position and, upon the return of the feeler means to said initial position, to cause operation of said stepping means while simultaneously freeing the feeler means for displacement at said controlled rate, whereby the angular adjustment of said first control elements determines the order of performance of the functions of the apparatus while the axial adjustment of said second control elements determines the relative times at which such functions are performed.

12. A system as in claim 11; wherein said control means includes a pressure fluid operated motor connected both to said stepping means and to said means for returning the feeler means to its initial position.

References Cited in the file of this patent

UNITED STATES PATENTS

| | | |
|---|---|---|
| 2,352,470 | Carlton | June 27, 1944 |
| 2,528,983 | Weiss | Nov. 7, 1950 |
| 2,543,759 | Cannon et al. | Mar. 6, 1951 |
| 2,921,563 | Baratossy et al. | Jan. 19, 1960 |